United States Patent [19]
Huang et al.

[11] Patent Number: 5,748,277
[45] Date of Patent: May 5, 1998

[54] DYNAMIC DRIVE METHOD AND APPARATUS FOR A BISTABLE LIQUID CRYSTAL DISPLAY

[75] Inventors: Xiao-Yang Huang, Kent; Philip J. Bos, Hudson; Deng-Ke Yang, Stow, all of Ohio

[73] Assignee: Kent State University, Kent, Ohio

[21] Appl. No.: 390,068

[22] Filed: Feb. 17, 1995

[51] Int. Cl.$^6$ .............................. C09K 19/02; G09G 3/36; G09G 5/00
[52] U.S. Cl. .......................... 349/169; 349/179; 345/95; 345/210
[58] Field of Search ..................... 359/84, 55, 91; 345/210, 179, 169, 143, 95

[56] References Cited

U.S. PATENT DOCUMENTS

| | | | |
|---|---|---|---|
| 4,239,345 | 12/1980 | Berreman et al. | 349/179 |
| 4,317,115 | 2/1982 | Kawakami et al. | 359/55 |
| 4,505,548 | 3/1985 | Berreman et al. | 349/179 |
| 4,514,045 | 4/1985 | Huffman et al. | |
| 4,529,271 | 7/1985 | Berreman et al. | 349/175 |
| 4,626,074 | 12/1986 | Crossland et al. | |
| 4,636,788 | 1/1987 | Hilbrink. | |
| 4,641,135 | 2/1987 | Hilbrink. | |
| 4,668,049 | 5/1987 | Canter et al. | |
| 4,705,345 | 11/1987 | Ayliffe et al. | |
| 4,728,175 | 3/1988 | Baron. | |
| 4,761,058 | 8/1988 | Okubo et al. | |
| 4,769,639 | 9/1988 | Kawamura et al. | |
| 4,864,538 | 9/1989 | Buzak. | |
| 4,909,607 | 3/1990 | Ross. | |
| 4,958,915 | 9/1990 | Okada et al. | |
| 5,036,317 | 7/1991 | Buzak. | |
| 5,132,823 | 7/1992 | Kamath et al. | |
| 5,168,378 | 12/1992 | Black et al. | |
| 5,168,380 | 12/1992 | Fergason. | |
| 5,189,535 | 2/1993 | Mochizuki et al. | 359/55 |
| 5,251,048 | 10/1993 | Doane et al. | |
| 5,252,954 | 10/1993 | Nagata et al. | 345/210 |
| 5,260,699 | 11/1993 | Lister et al. | |
| 5,280,280 | 1/1994 | Hotto. | |
| 5,285,214 | 2/1994 | Bowry. | |
| 5,289,175 | 2/1994 | Kawagishi | 359/84 |
| 5,289,300 | 2/1994 | Yamazaki et al. | |
| 5,293,261 | 3/1994 | Shashidhar et al. | |
| 5,315,101 | 5/1994 | Hughes et al. | |
| 5,594,464 | 1/1997 | Tanaka et al. | 345/95 |

Primary Examiner—William L. Sikes
Assistant Examiner—Tiep H. Nguyen
Attorney, Agent, or Firm—Renner, Kenner, Greive, Bobak, Taylor & Weber

[57] ABSTRACT

A flat-panel liquid crystal display. The display includes a flat sheet of bistable chiral nematic liquid crystal material activated by a drive circuit that individually controls the display state of multiple picture elements at a refresh rate 1000 scan lines per second. The driver circuitry activates the liquid crystal domains into homeotropic states over a relatively long activation period and then, during a short (~1 msec.) selection period, either keeps the domains in a homeotropic state or initiate a transition to the transient twisted planar state. The drivers then activate the domains in an evolution phase to provide either focal conic or twisted planar end states across the two-dimensional array of picture elements.

25 Claims, 12 Drawing Sheets

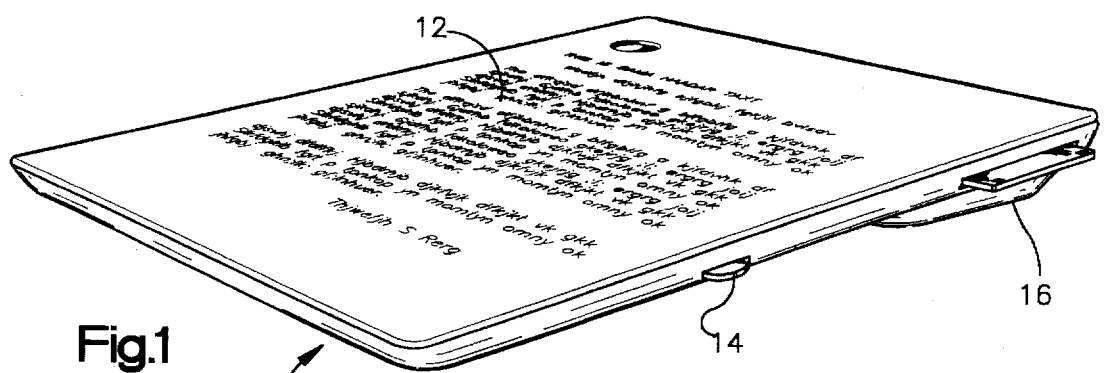
Fig.1
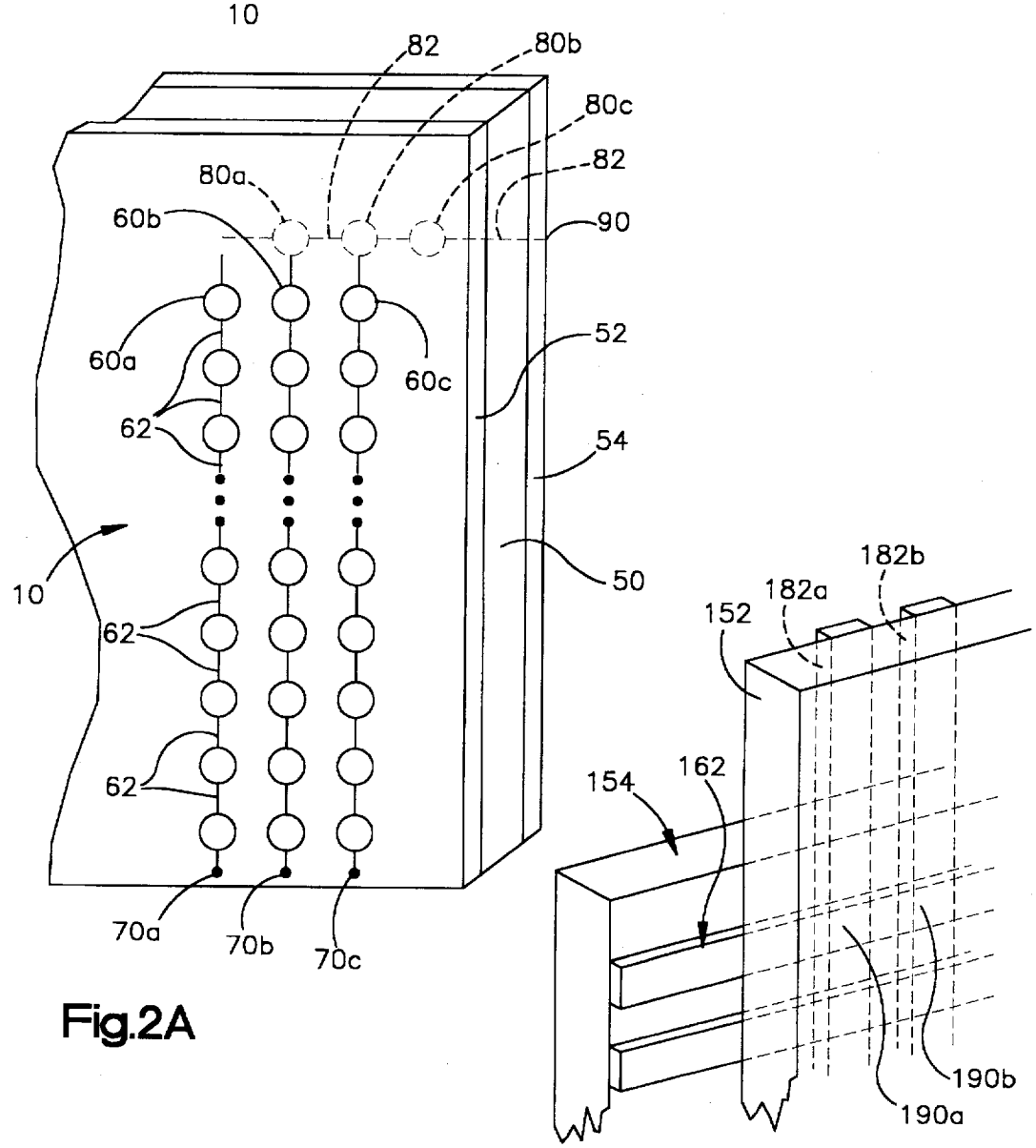
Fig.2A
Fig.2B

DYNAMIC DRIVE METHOD AND APPARATUS FOR A BISTABLE LIQUID CRYSTAL DISPLAY

FIELD OF THE INVENTION

The present invention concerns a visual display utilizing a chiral nematic, also called cholesteric, reflective bistable liquid crystal material and an electronics drive system for activating the display using efficient operation to provide high-speed updating of the display.

BACKGROUND ART

Liquid crystals have been used to display information in flat-panel displays for many years, such as are commonly used in watch faces or half page size displays for lap-top computers and the like.

One current display technology is the super twisted nematic (STN) type. Although these types of devices are relatively inexpensive, they are limited in the number of lines that can be addressed because of the steepness of their electro-optic curve and the tight voltage tolerances that need to be maintained. Even though the technology is now highly developed current devices are limited to approximately 500 lines. These displays also have the drawback of requiring polarizers, which limits brightness, and require glass substrates which increase the weight of the display and are susceptible to breakage. Another current display technology is the so called thin film transistor (TFT) type. In these devices, the liquid crystal electro-optical element is driven by a thin film transistor that is present at each pixel in a so called active matrix. These types of displays are expensive to manufacture. As the size of the existing half page TFT displays is increased to full page size, the number of transistors and the area of substrate increase by a factor of two and, at the current time, this results in an unacceptable expense.

Thus, a principal shortcoming of the current generation of displays is that they are inherently limited to half page, rather than full page capability. Accordingly, there is still a need for a technology that enables cost effective page size displays that can be updated at page turn rates.

Liquid crystal displays made up of bistable chiral nematic materials do not require continuous updating or refreshing. When data or information changes on the display, the electronics update the display. If, however, the display information does not change, the display can be written once and remain in its information-conveying configuration for extended periods without display processor intervention. The ability to remain in a stable state for an extended period has resulted in use of chiral nematic liquid crystal displays for signs that can be slowly updated over relatively long periods of time. Since the display information does not change, the fact that it may take longer to write the initial information to the display is not important.

Advantageously, chiral nematic bistable devices can be prepared that have no limit to the number of lines that can be addressed, making them excellent candidates to provide the needed page size displays. However, the update rate of these displays is far too slow for many page size display applications such as electronic manuals or electronic news papers and the like. For these types of applications, the device needs to be addressed in about 1 second or less to be comparable with the time required to turn a page manually. However, the update refresh rate of the current chiral nematic display technology is greater than 10 seconds for a 1000 line page size display. Clearly, there is a need for a commercially viable display for use in information-conveying devices such as page size viewers, electronic books, pager and telephone displays, and signs that must be addressed more quickly. Updating information on a passive matrix liquid crystal display at rates fast enough to convey information in a commercially acceptable manner of, for example, 1 second or less has presented a problem to prior art liquid crystal displays.

A number of prior art patents address problems in updating liquid crystal display information. So-called liquid crystal display drivers or electronic circuits are known in the prior art and utilize various techniques for updating a liquid crystal display. U.S. Pat. No. 5,251,048 which issued Oct. 5, 1993 to Doane et al. concerns a method and apparatus for electronic switching of a reflective color display system. This patent discloses use of a liquid crystal light-modulating material that is confined between substrates. Elongated conductive paths supported on opposite sides of the substrates activate picture elements at controlled locations to set up a display screen. The disclosure of the '048 patent to Doane et al. is incorporated herein by reference.

A paper entitled "Stored Type Liquid Crystal Matrix Display" to Tani et al. (SID 79 Digest, p. 114–115) proposes a liquid crystal display driver system whose operation takes into account transitions between various states of a chira nematic liquid crystal material. The paper describes a new storage type liquid crystal display having the advantages of long storage time which makes refreshing or updating of the information on the display unnecessary. However, the Tani et al. drive scheme is limited in its resolution and information density conveying ability. His drive waveform and technology are limited in the number of lines that can be addressed to roughly 100 lines, far less than the 1000 lines required for page size viewer applications. Also, his demonstrated writing times of greater than 8 ms per line are insufficient for commercially acceptable page size viewers. On a flat-panel display or the like, 100 lines of information in a liquid crystal display is not acceptable for conveying text and 8 ms per line is far too slow for many applications.

DISCLOSURE OF THE INVENTION

A central aspect of this invention is an addressing method for bistable liquid crystal high-resolution, large size display at a page-turn rate. The present invention takes advantage of discoveries concerning transitions from one optical state or texture to another of a bistable chiral nematic liquid crystal material. Rapid switching times achieved through practice of the invention make possible the use of bistable chiral nematic liquid crystals in passive matrix systems having address rates of more than 1000 scan lines per second. Such refresh rates are a significant improvement for use in a flat-panel display for a page size viewer, electronic book or the like.

In accordance with the invention, a control is coupled to a display having a layer of bistable chiral nematic liquid crystal material disposed between cell walls. The chiral nematic liquid crystal material is provided in a thin layer and bound by electrodes on opposite sides of the material which selectively activate the picture elements of the display. Such activation causes the liquid crystal to exhibit vary liquid crystal textures in response to different field conditions. In particular, and while not wanting to be bound by theory, at higher voltages the liquid crystal assumes the homeotropic texture wherein the liquid crystal director is aligned perpendicular to the cell surface. In the twisted planar, also called Grandjean, texture, the liquid crystal is characterized by a helical structure, the pitch length of which depends upon the amount of chiral material present. The helical axes of the twisted planar texture are perpendicular to the cell surface and, depending on the cell, this texture is stable in the absence of a field. In the transient twisted planar (transient Grandjean) texture the pitch length is roughly twice that of the twisted planar texture. This state occurs when an applied field holding the material in the homeotropic texture is suddenly reduced or removed. This state is transient to either the twisted planar or focal conic texture depending upon the conditions present. Finally, there is the focal conic state, where the helical axes are, for the most part, randomly aligned. Depending on the cell this state may also be stable in the absence of a field.

With the bistable chiral nematic liquid crystal for use in the inventive method, both the planar and focal conic states can exist and both are stable at zero field. The homeotropic state will relax at a sufficiently low field, or zero field, to the transient planar state or to the focal conic state, the former of which will then relax to a planar state or a focal conic state depending on the conditions present. Only the transition from the homeotropic to the transient planar is especially fast, less than about 2 ms. The bistable display operation of the invention is based on this fact and the optical distinction between the twisted planar and focal conic states. It is the allowance or prevention of the homeotropic to transient planar transition at the appropriate phase in the inventive drive scheme that enables the advantageous results obtained thereby. When the pitch length of the material is adjusted to reflect light in the visible spectrum, the planar state will reflect colored light and the rest of the states will appear transparent or nearly transparent. In a display device wherein the back surface of the cell is painted black, the planar state can be made to reflect light of any desired color depending on the pitch length, and the remaining states will appear black to the observer.

In accordance with a preferred embodiment of the invention, chiral nematic liquid crystal display elements are activated in a series of steps to control their transitions during the refresh or update stage of the display process.

The first step is referred to herein as the preparation phase, during which a pulse or series of pulses causes the liquid crystal within the picture element to align in a homeotropic state. Advantageously, a large number of lines can be simultaneously addressed during the preparation step.

The second step is referred to herein as the selection phase or step. During the selection phase, the voltages applied to the liquid crystal within the picture element are chosen so that the final optical state of the pixel will be either focal conic or twisted planar. In practice the voltage is chosen to either maintain the homeotropic state or reduced enough to initiate a transition to the transient twisted planar state during the selection phase.

The next step is a so-called evolution phase, during which the liquid crystal selected to transform into the transient twisted planar state during the selection step now evolves into a focal conic state and the liquid crystal selected to remain in the homeotropic state during the selection phase continues in the homeotropic state. The voltage level of this evolution phase must be high enough to maintain the homeotropic state and permit the transient planar state to evolve into the focal conic state, but low enough so that the transient planar state does not evolve to the homeotropic state. In another preferred embodiment, a lower voltage may be chosen for the evolution phase, which has the effect of changing the final state that will result from the selection phase. In this embodiment, the evolution voltage applied at the end of the selection phase has a magnitude that allows pixels in the transient twisted planar state to evolve into the twisted planar state, and pixels that are in the homeotropic state to evolve to the focal conic state. Thus, this evolution voltage must be carefully chosen to be high enough so that the homeotropic state does not transform to the transient planar state, but low enough that the transient planar state does not evolve to the focal conic state and the homeotropic state transforms to the focal conic state. Importantly, the drive scheme is implemented using one or the other of a high or low evolution voltage. Whichever evolution voltage is chosen, it is the same for all the pixels. This is to be contrasted with the selection voltage which may change from pixel to pixel.

During a final hold state, the voltage is taken to near zero or removed entirely from the picture element. The liquid crystal domains which are in the focal conic state remain in the focal conic state after removal of the voltages and those in the homeotropic state transform into a stable light reflecting twisted planar state. In the case were the lower evolution voltage is used, any pixels in the focal conic state at the end of the evolution phase will remain in that state, and any pixels in the twisted planar state will remain in that state. Thereafter, the pixels will remain in those states until addressed again. Since all pixels require the same preparation and evolution voltage, the time can be shared during preparation and evolution phases by employing a pipeline algorithm. Multiple lines may be simultaneously addressed with the preparation voltage and then, after selection, multiple lines may be simultaneously addressed with the evolution voltage. When the number of lines to be addressed is large, the average address time per line is equal to the time of the selection phase.

The result of this sequence of pulses or voltages on the liquid crystal that make up a picture element is to select between the focal conic and light reflecting twisted planar state. Of course, the particular voltages necessary for each of the addressing steps will depend on the cell thickness and the particular materials used, and hence will vary from cell to cell. However, the selection of appropriate voltages to implement the inventive drive scheme in a particular cell will be apparent to those of ordinary skill in the art in view of the instant disclosure. A major advantage achieved by practice of the invention is shortening of the selection pulse, thereby increasing the number and thus density of picture elements which can be updated at an acceptable speed. In accordance with the invention, the display can be refreshed at page turning rates on the order of 1 second or less and the resolution and display size can increased to desired values.

In application of the preferred method, the liquid crystal material is disposed between two cell walls or surfaces so that a small pixel sized region of the liquid crystal material will be sandwiched between one row and one column electrode. The electrodes on either side of the liquid crystal material are activated by a circuit that periodically updates the display. Each picture element of the array is first sequentially energized by a preparation signal. The signal coupled across the picture element is then reduced during a selection phase. During this selection phase a discrete control voltage is applied to the liquid crystal to select between a pixel that will have a twisted planar (reflecting) or a focal conic (transparent or weakly scattering) state. The signal is then again changed across the picture element during an evolution phase, and finally, the liquid crystal enters its final predetermined state dependent upon the selection voltage.

As is often the convention, one row at a time is "selected" and the state of only the pixels in this row will be affected by the "data" voltages applied to the columns during the selection phase. As a result of the data voltages applied to the columns, pixels in the selected row will then be set to a desired state or texture. However, as is not the convention, specific voltages will also be applied to the row electrode of a particular row both before and after the selection phase for that row. The voltage applied to a row before the selection phase, i.e., during the preparation phase, will be sufficient to write all of the pixels in the row to the homeotropic state. The voltage applied to the row after the selection phase, i.e, during the evolution phase, will be selected to cause the pixels to "evolve" to a desired final state.

The control electronics for activating the liquid crystal display is most preferably a dedicated processor for applying control voltages to row and column arrays of electrodes coupled to the flat-panel display.

A preferred mechanism for activating the orthogonally arranged electrodes of a matrix-type liquid crystal display is discussed below. This exemplary embodiment of the invention will better explain operation of a liquid crystal display constructed in accordance with the invention. dr

BRIEF DESCRIPTION OF THE DRAWINGS

FIG. 1 is a perspective view showing a flat-panel liquid crystal display used for displaying images on a portable document viewer;

FIGS. 2A and 2B are schematics depicting configurations for energizing row and column picture elements of the flat-panel display;

BEST MODE FOR PRACTICING THE INVENTION

Figure 3A:
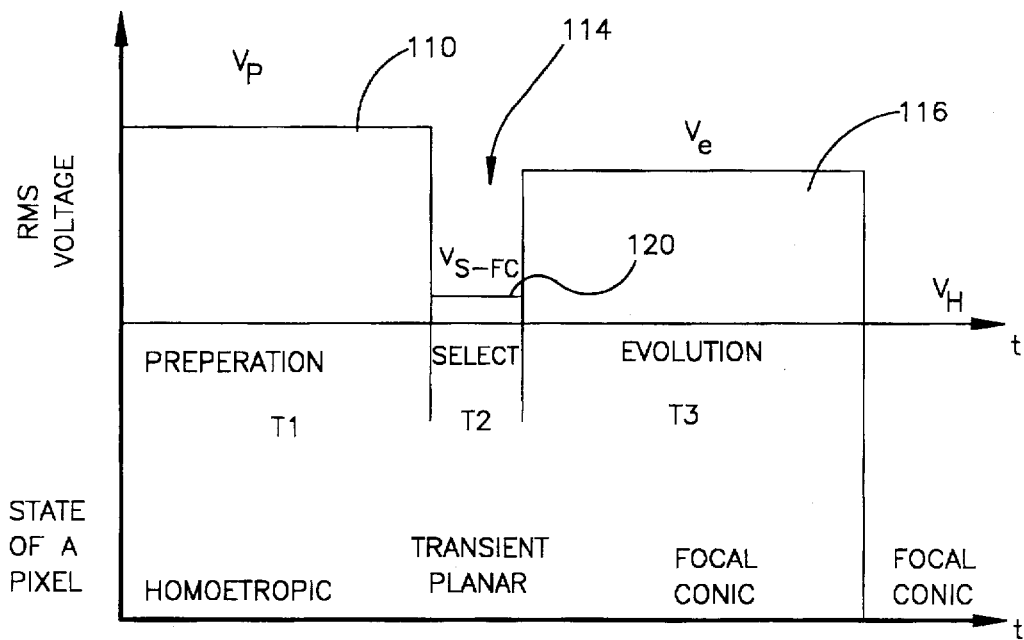
FIGS. 3A and 3B are voltage sequences that are coupled across liquid crystal material to achieve two different liquid crystal display states.

As an example application of the invention, a matrix display as is known in the art may be considered that has row electrodes patterned on the inside of one of the cell surfaces, and column electrodes pattered on the inside of the other cell surface.

As described, the preferred addressing cycle according to the invention includes four states where voltages are applied to columns and rows as follows. First, there is the preparation phase, where pixels in a particular row are addressed by the row electrode with a high voltage causing all of them to switch to the homeotropic state. Next, in the so called selection phase, the voltage applied to one selected row is of a value that, when combined with the data voltages applied to the columns of the display, result in voltages being applied to particular pixels in the selected row effective to switch the pixel to a state corresponding to the value of the voltage applied to the column electrodes. This state will either be transient planar or homeotropic. Third, in the so called evolution phase, those pixels in the transient planar texture after the selection phase evolve to the focal conic texture and those pixels in the homeotropic state after the selection phase remain in the homeotropic state. Finally, there is a hold or storage phase during which the voltage is reduced or taken to zero and the pixels in the focal conic state remain in that state, while the pixels in the homeotropic state relax to the reflecting twisted planar state.

Turning now to the drawings, FIG. 1 shows a flat-panel liquid crystal display 10 for use with a document viewer 12 with which the aforementioned method may be employed. The particular viewer 12 shown in FIG. 1 is a portable electronic viewer for books, news or similar documents, which includes a page selection switch 14 that is integral with the unit and a memory card or floppy disk 16 which can carry the information to be viewed on the document viewer 12. Such a viewer 12 may conveniently include a hard disk drive, a floppy disk drive, and/or various other input/output devices.

The display 10 is most preferably capable of displaying images as well as text. For displaying images and text it is necessary to refresh or update the display 10 in about one second or less to limit user perception of the updating process. Resolution of the display 10 is quantified in terms of vertical and horizontal lines on the display screen. Present minimum resolution requirements for a page size document viewer is 1,000 lines, which must be capable of being addressed in less than about 1 second.

Although the invention is disclosed in the context of document viewer 12, the present invention has applicability to other displays for use with palm-held computers, pagers, computers for conveying specialized information, signs, electronic books and newspapers and the like as would be known to those of ordinary skill in the art in view of this disclosure. In addition, larger displays such as for highway signs and the like can incorporate the methods and apparatus of the invention.

The display 10 is constructed using a reflective bistable chiral nematic liquid crystal material whose display state can be controlled by application of a control voltage across the liquid crystal material. Suitable chiral nematic liquid crystal materials and cells, as well as their manner of preparation would be known to those of ordinary skill in the art in view of this disclosure. Preferred chiral nematic liquid crystal materials and cells are disclosed in, for example, co-pending application Ser. Nos. 08/057,662 filed May 4, 1993, and 07/969,093 filed Oct. 30, 1992, the disclosures of which are incorporated herein by reference. Depending upon the size and duration of the control voltage, a picture element (pixel) can be made to exhibit a light reflecting twisted planar texture, a homeotropic texture or a focal conic texture. Control over each picture element of the display is possible due to the ability of the chiral nematic liquid crystal material to be rapidly updated.

The perspective schematic view of FIG. 2A shows a small segment of the display 10. A layer 50 (thickness of 5 microns) of chiral nematic liquid crystal material is sandwiched between two clear containment plates 52, 54 which do not interfere with the light reflecting or transmissive characteristics of the material 50.

Attached on either side of the plates 52, 54 are arrays of electrodes coupled to a circuit (FIG. 7) described below for energizing the electrodes. As seen in FIG. 2A, the plate 52 supports ordered arrays of interconnected electrodes. The electrodes on the plate 52 are interconnected to define columns of interconnected electrodes all maintained at the same electrical potential. As an example, the electrode 60a and all other electrodes that form a column of electrodes are coupled to electrical leads 62 energized at an input 70a along a bottom edge of the display 10. Similarly, the electrode 60b is maintained at the same electrical potential as other interconnected electrodes in its column by the input 70b. Finally, a third representative electrode 60c is interconnected with other electrodes along the column energized by the input 70c.

As described more fully below, a display state of a picture element directly beneath the electrode 60a is controlled by a voltage difference between the electrode 60a and the voltage on an electrode 80a on the other side of the liquid crystal layer 50 that is supported by the plate 54. Three electrodes 80a, 80b, 80c are shown in phantom positioned on an opposite side of the display 10. These electrodes 80a, 80b, 80c are electrically interconnected by electrical leads 82 coupled to an input 90 at the edge of the containment plate 54.

Selective control of the voltage applied to the electrodes 60a, 80a determine the electric potential applied across the liquid crystal material defining the picture element or pixel beneath the electrodes 60a, 80a. By control of the voltage applied to the inputs 70a, 90, this potential can be adjusted and, more specifically, can be controlled in accordance with a method for choosing between a picture element in the focal conic texture and a picture element in the twisted planar texture. By selectively controlling the optical characteristics of each picture element that make up the display 10, the drive circuits 58 can present an image or display text on the display.

Such a display can be updated at rates of at least 500 scan lines per second. It is noted that the electrodes are conceptually represented by circles, e.g. 60a, in FIG. 2A, to facilitate the discussion of the various states of a display shown in FIGS. 4A–4F.

FIG. 2B is a second representation more accurately reflecting the structure of a passive matrix type display for application of the inventive method. As can be seen in FIG. 2B, plates 152 and 154 support transparent electrodes 162 and 182a, 182b coated as lines onto the substrates. The circles such as 60a in FIG. 2A represent pixels which, as shown at 190a and 190b in FIG. 2B, occur at the intersection of the conductive electrode 162 with conductive electrodes 182a and 182b, respectively.

Figure 3B:
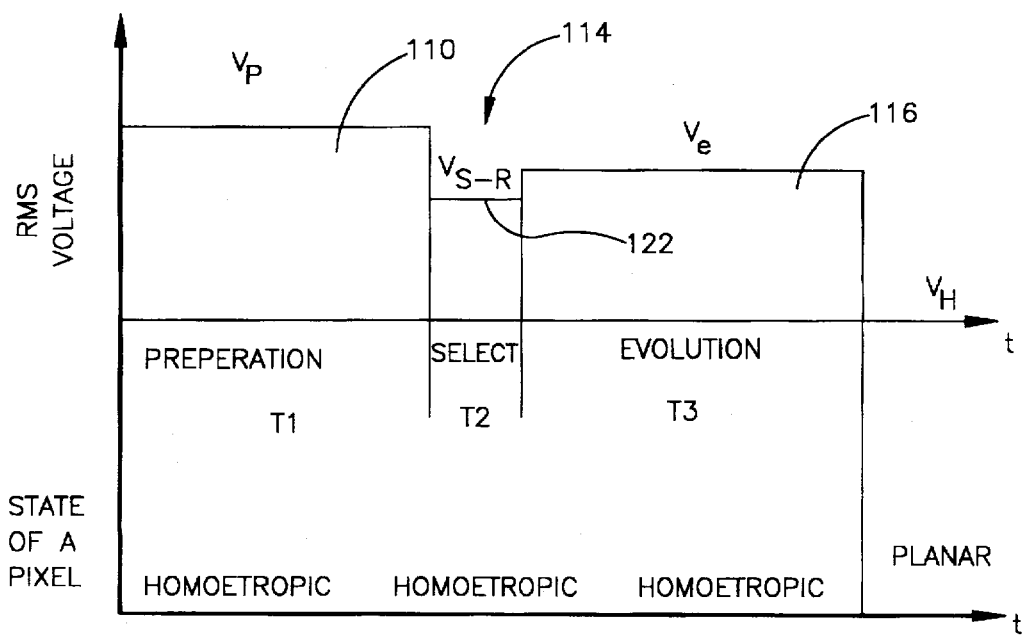

FIGS. 3A and 3B illustrate a manner in which the display state of a picture element is controlled. Chiral nematic liquid crystal material, as is known in the art, can be energized by application of a voltage to exhibit multiple optical states or textures. Three representative textures for the liquid crystal material are homeotropic, twisted planar, and focal conic. When in the homeotropic state, the liquid crystal material is transparent to normally incident light impinging upon the liquid crystal material. When in the focal conic state, the liquid crystal material weakly scatters the light, although if the path length is short enough the state can appear transparent, particularly when the back substrate is painted black. When in the twisted planar state, the liquid crystal material reflects the light. The final display state of picture elements of liquid crystal material that make up the display 10 is selected in accordance with the inventive method to be in either the focal conic or twisted planar state. The liquid crystal in the planar texture reflects light impinging upon the display, and the liquid crystal in the focal conic texture will appear transparent or weakly scattering to provide sufficient contrast with the planar texture. No back-lighting is required.

FIGS. 3A and 3B display root means square (rms) voltages as a function of time applied across a picture element (pixel) to achieve either the focal conic (3A) or the twisted planar (3B) state. As seen in FIGS. 3A and 3B each of the control voltages applied to the liquid crystal material starts with a preparation phase 110 of duration T1, during which the liquid crystal material is forced into its homeotropic state. The voltage during the preparation phase $V_P$, and the duration of this phase T1 need to be sufficient to cause the complete transformation of the material to the homeotropic texture. Although there is no upper limit on the values that will drive the material to the homeotropic state, if they are too low then after the completion of the addressing cycle the device will not have as high a reflectivity in the reflecting state as is possible. However, in theory, once $V_P$ is high enough and T1 is long enough to drive the material completely into the homeotropic state, the preparation step is essentially satisfied and the final state of the pixel will not be dependent on the state of the pixel prior to the preparation phase. In practical application, the maximum value of $V_P$ is limited by the hardware. Moreover, an excessively long T1 conflicts with the objective of quickly updating the display. Thus, ideally the parameters for any given display should be optimized to employ a $V_P$ as low as possible to simplify the driver hardware and display design, and a T1 as short as possible to optimize driving speeds. Increasing the value of $V_P$ will in general shorten the value of T1.

In one embodiment the preparation stage may be modified to allow less image retention from the initial states of the liquid crystal prior to entering the preparation phase, which degrades the final reflectance from the device. Typically, the values of $V_P$ and T1 will be higher than desirable in order to avoid this image retention effect. However, in this embodiment, the preparation stage can include a pre-aligning sequence adapted to more completely align the liquid crystal into the homeotropic texture prior to the selection phase. The pre-aligning sequence essentially comprises a first voltage pulse of a magnitude and duration sufficiently high to homeotropically align the liquid crystal as in the normal case of the preparation phase. However, the voltage is then reduced or removed for a short period of time, about 0.5 to 5 ms, to permit the liquid crystal to transform to the transient planar state, from which the liquid crystal can be more easily and completely switched into the homeotropic state with a high voltage $V_P$ for the remainder of the preparation phase. By more completely switching the material into the homeotropic texture during the preparation phase in accordance with this embodiment, any variation in the quality of the final optical state of a pixel caused by image retention of different initial states prior to the preparation phase is essentially eliminated. This also improves the contrast ratio. If desired, the pre-aligning sequence can be repeated several times during the preparation phase.

After an appropriate time period T1 which, in a preferred embodiment in the invention is approximately 40 milliseconds, the method enters the so called selection phase, wherein the liquid crystal material is activated with a selection voltage $V_S$ for selecting between the focal conic and twisted planar final state. An important aspect of the invention is that this so-called selection phase 114 lasts only a short period T2 (about one or two milliseconds), much less than the preparation phase 110. In application of the addressing sequence of the invention, the selection voltage may be applied to one line at a time, progressing down the rows in pipe-line fashion.

Figure 3C:
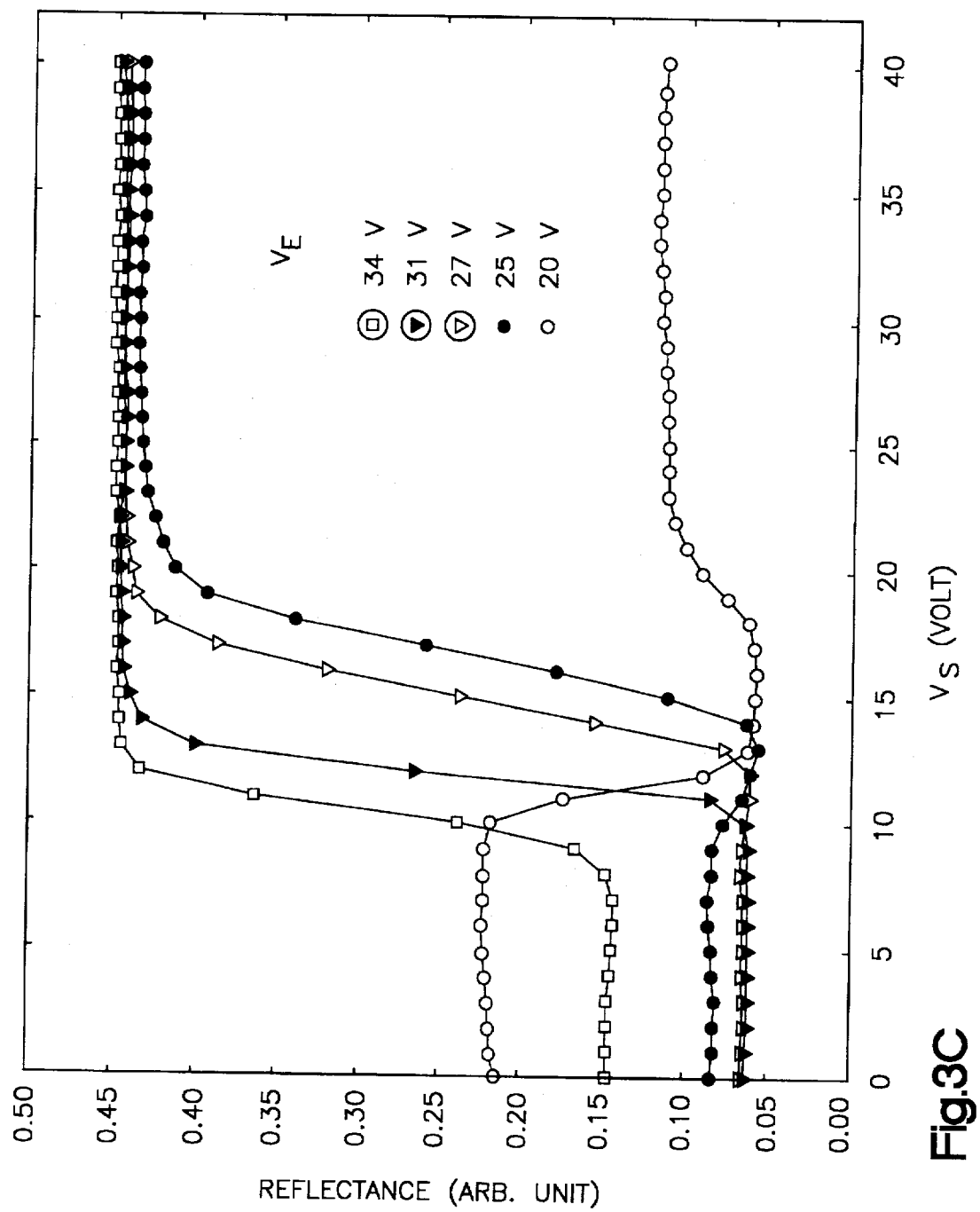
FIG. 3C is a plot showing the effect of varying evolution phase voltages on a final state of a liquid crystal material with respect to varying selection phase voltages.

Without wanting to be bound by theory, it is also contemplated that several lines may be selected simultaneously, with the plurality of selected rows being moved down the display in pipe-line fashion. The ability to select more than one line at a time is in theory made possible due to the steepness of the select pulse vs. final intensity curve as shown, for example, in FIG. 3C for the case of $V_E$ equal to 31 volts. As can be seen in FIG. 3C, 14 volts would be a sufficient selection voltage to drive the pixel to the reflective state, and 11 volts would be sufficiently low to drive the pixel to the focal conic state. By applying the well known Alt and Pleshko waveforms to the lines being selected, the number of lines that can be simultaneously selected is dependent on the ratio of the selection voltage necessary to drive the pixel to the reflective state ($V_{S-R}$), and the selection voltage necessary to drive the pixel to the focal conic state ($V_{S-FC}$) according to the relation: # lines=$[((V_{S-R}/V_{S-FC})^2+1)/((V_{S-R}/V_{S-FC})^2-1)]^2$. For the values of $V_{S-R}$ equal to 14 volts and $V_{S-FC}$ equal to 11 volts, this would indicate that about 18 lines could be selected at one time for the material and cell used to produce FIG. 3C.

During an evolution phase 116, the liquid crystal material is energized for a period T3 at an evolution voltage $V_E$ less than the preparation voltage, but greater than the selection voltage. In the evolution phase 116, the liquid crystal material is either maintained in a homeotropic configuration or evolves into a focal conic state. When the evolution voltage $V_E$ of FIGS. 3A and 3B is removed, the liquid crystal material enters a focal conic (FIG. 3A) or twisted planar (FIG. 3B) final state depending upon the voltage chosen during the selection phase 114. As seen by comparing the FIG. 3A and 3B waveforms, the only difference in voltage occurs during the selection phase 114, during which $V_S$ either has a relatively low voltage $V_{S-FC}$ 120 (FIG. 3A) or a higher voltage $V_{S-R}$ 122 which determines the final state of the picture element to be focal conic or light reflecting twisted planar, respectively.

While the selection voltage determines the final state of a pixel, it is noted that the evolution voltage can effect the appearance of the pixel. FIG. 3C shows the effect of the choice of $V_E$ on a graph of selection voltage versus final device reflectance. It can be seen that for $V_E$ greater than 34 volts a selection voltage $V_S$ of less than 11 volts does not result in a state of lower reflection, and that for $V_E$ less than 25 volts the same problem occurs, and the reflection resulting from $V_S$ greater than 14 volts is reduced from its maximum value. Thus, with this device it has been found that for proper operation of the addressing scheme according to this preferred embodiment, $V_E$ must be between 25 and 34 volts, with 31 being a preferred value. It is also notable that by increasing T3, the duration of the evolution phase, one can improve the contrast ratios between the twisted planar and focal conic states. However, this also has the effect of slowing the drive speeds. Conversely, while increasing the value of $V_E$ is conducive to faster speeds, it reduces the contrast ratio. Of course, the specific optimum voltages will vary depending upon specific materials used and construction of the cell, but it would be within the ordinary skill in the art to optimize such parameters in view of the instant disclosure.

Figure 5:
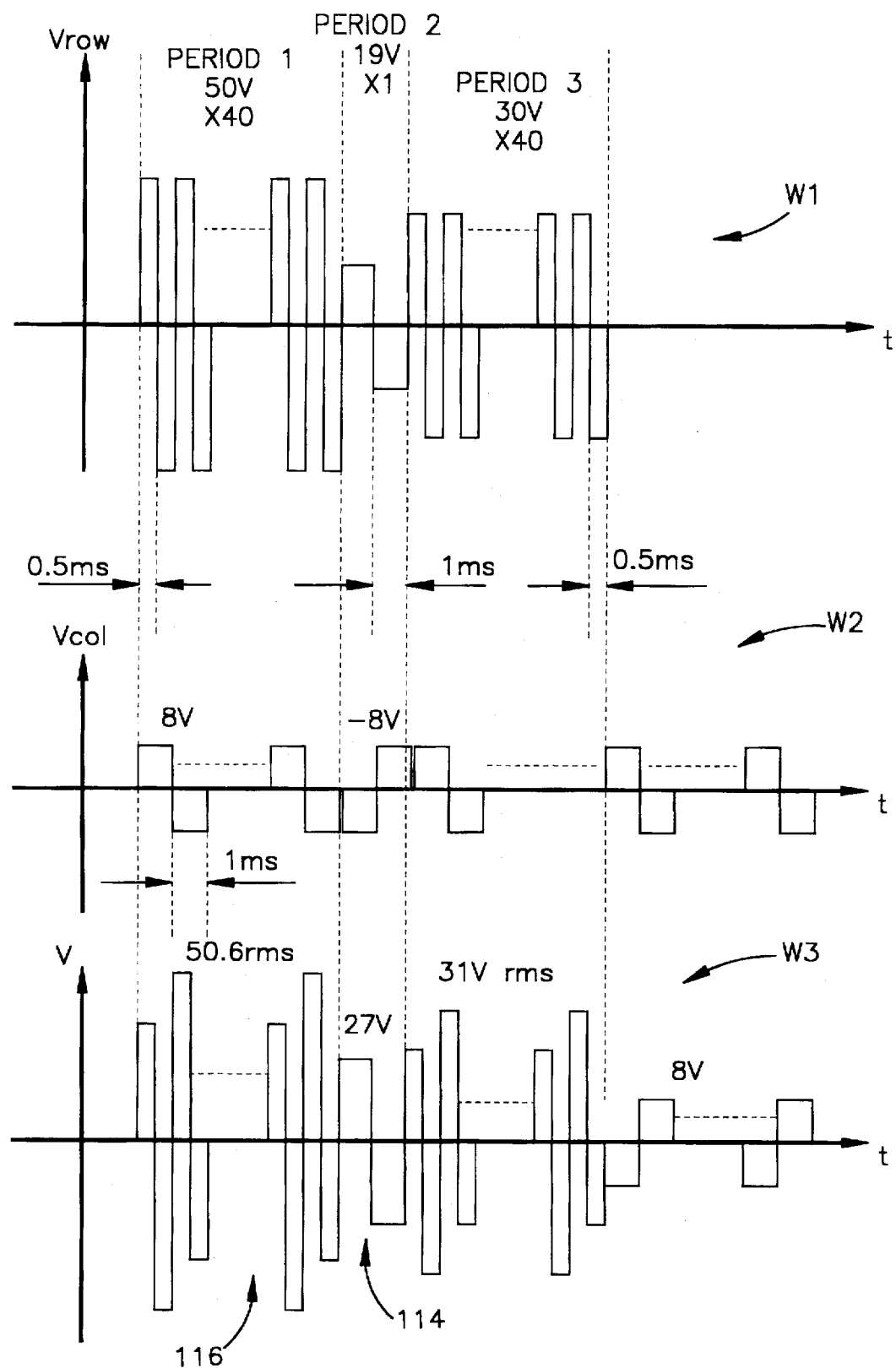
FIGS. 5 and 6 are a series of waveforms used in activating the liquid crystal picture elements.
Figure 6:
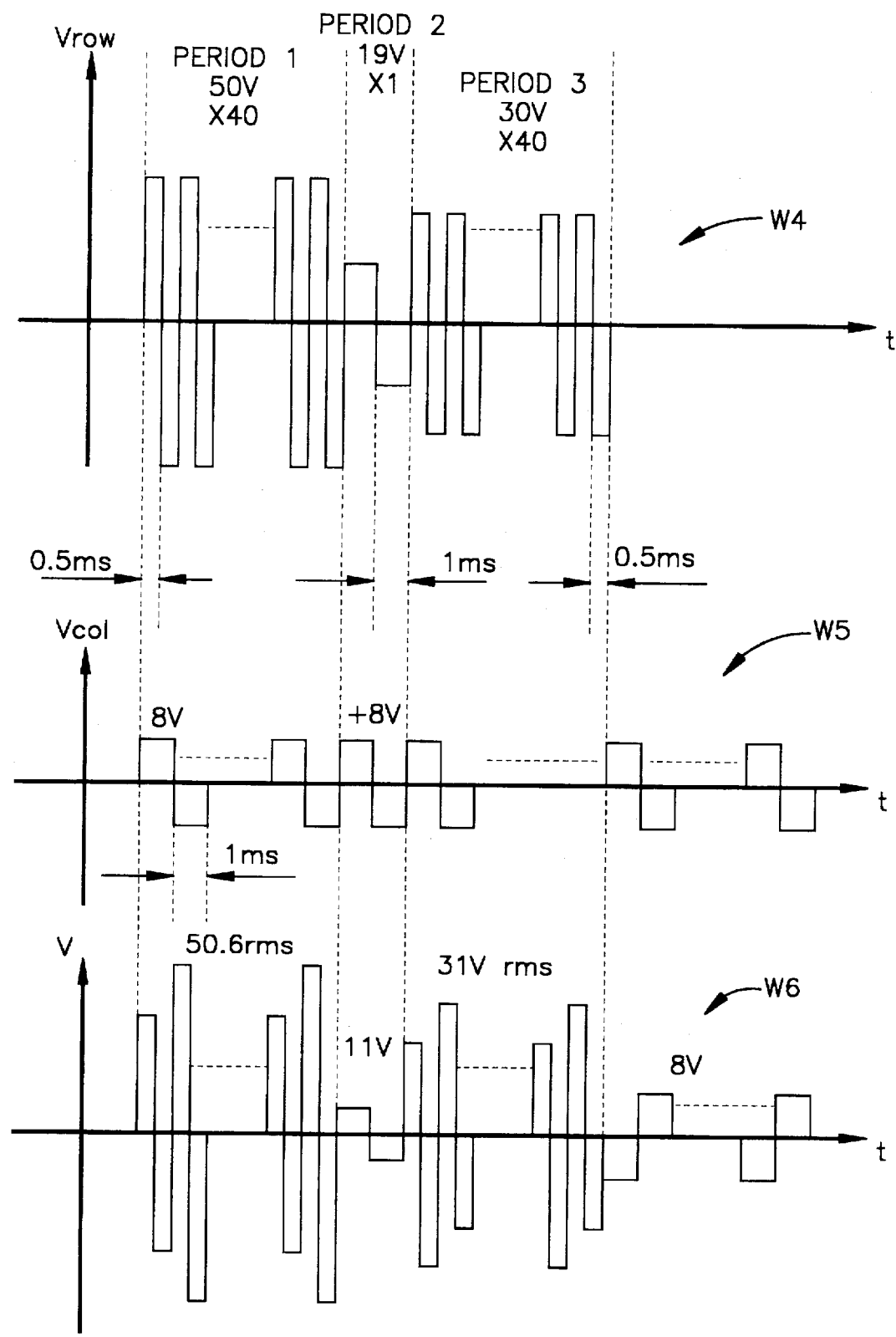

The waveforms depicted in FIGS. 3A and 3B are root means square voltage representations. The actual waveforms are shown in FIGS. 5 and 6. The waveforms are bipolar signals which oscillate above and below ground voltage to avoid ionic conduction to the liquid crystal material sandwiched between the two plates 52, 54. The RMS voltages across the liquid crystal material are about 50 volts during the preparation phase 110, 31 volts during the evolution phase 116, and a choice of either 11 volts or 27 volts during the selection phase 114 depending upon the desired final state.

As shown in FIG. 5 and FIG. 6, the column voltage is applied to the display through the whole addressing time period until the end of the evolution stage of the very last row. In order to obtain twisted planar states with high reflectivity, the column voltage $V_{col}$ must be lower than a certain value. If the column voltage is too high, the transition from the homeotropic state to the twisted planar state can not occur and/or the pixels that are already written to the twisted planar state may be switched to the focal conic state. Another limitation on the column voltage is that $2V_{col}$ must be large enough to obtain the desired final state. As can be seen in FIG. 3C, for the $V_E$=31 volts curve, the $2V_{col}$ needs to be greater than about 5 volts.

It has been observed that if the voltage in the preparation and evolution phases have the same frequency as the column voltage, then the effect of data voltages on the pixels in the preparation and evolution phases can cause improper operation of the device known as "crosstalking." Due to the sensitivity of the operation of the device to the value of the voltage applied during the evolution phase, the effect can be particularly large. However, it has been found that if the frequency of the voltage applied to the rows of pixels in the preparation and evolution phases is of a different frequency than that applied to the columns, the crosstalking effect is reduced. In order to further prevent the crosstalking effect, the frequency of the row voltage in the select phase ($f_S$) is the same as the frequency of the column voltage ($f_{col}$), and in the preparation and evolution phases, the frequency $f_P$ and $f_E$ are different from $f_{col}$ according to the following relations:

$$f_S = f_{col}$$

$$f_P = nf_{col} \text{ or } f_P = (1/n)f_{col}$$

$$f_E = mf_{col} \text{ or } f_E = (1/m)f_{col}$$

wherein n and m are integers greater than 1. In the example depicted in FIGS. 5 and 6, $f_S=f_{col}=500$ Hz, and $f_P=f_E=2 f_{col}=1000$ Hz.

Figure 4A:
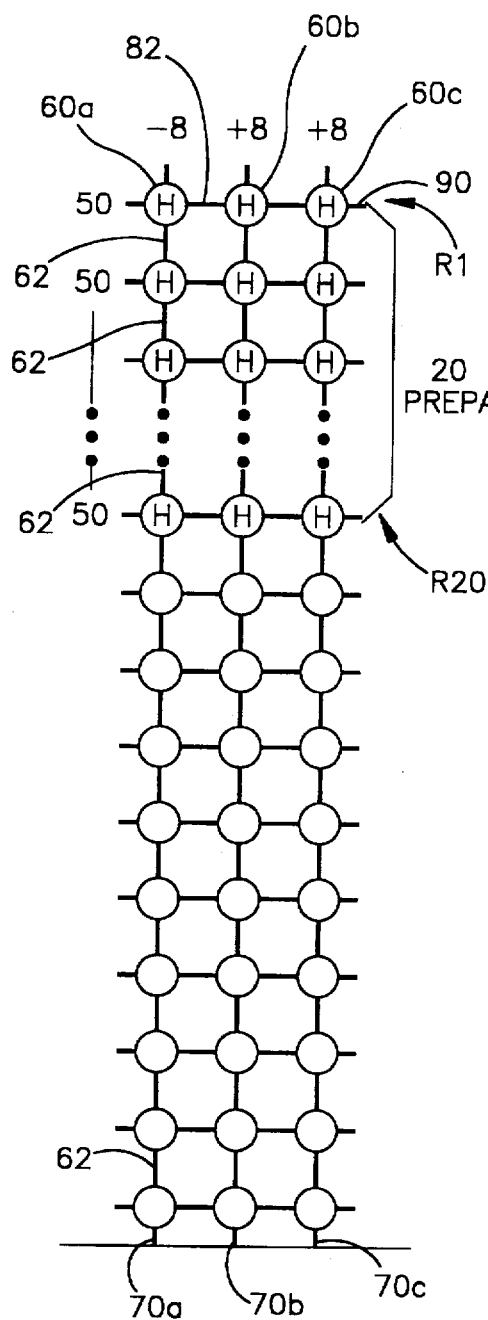
FIGS. 4A–4F are schematics showing arrays of electrodes for controlling the display states of liquid crystal material sandwiched between the electrodes.
Figure 7:
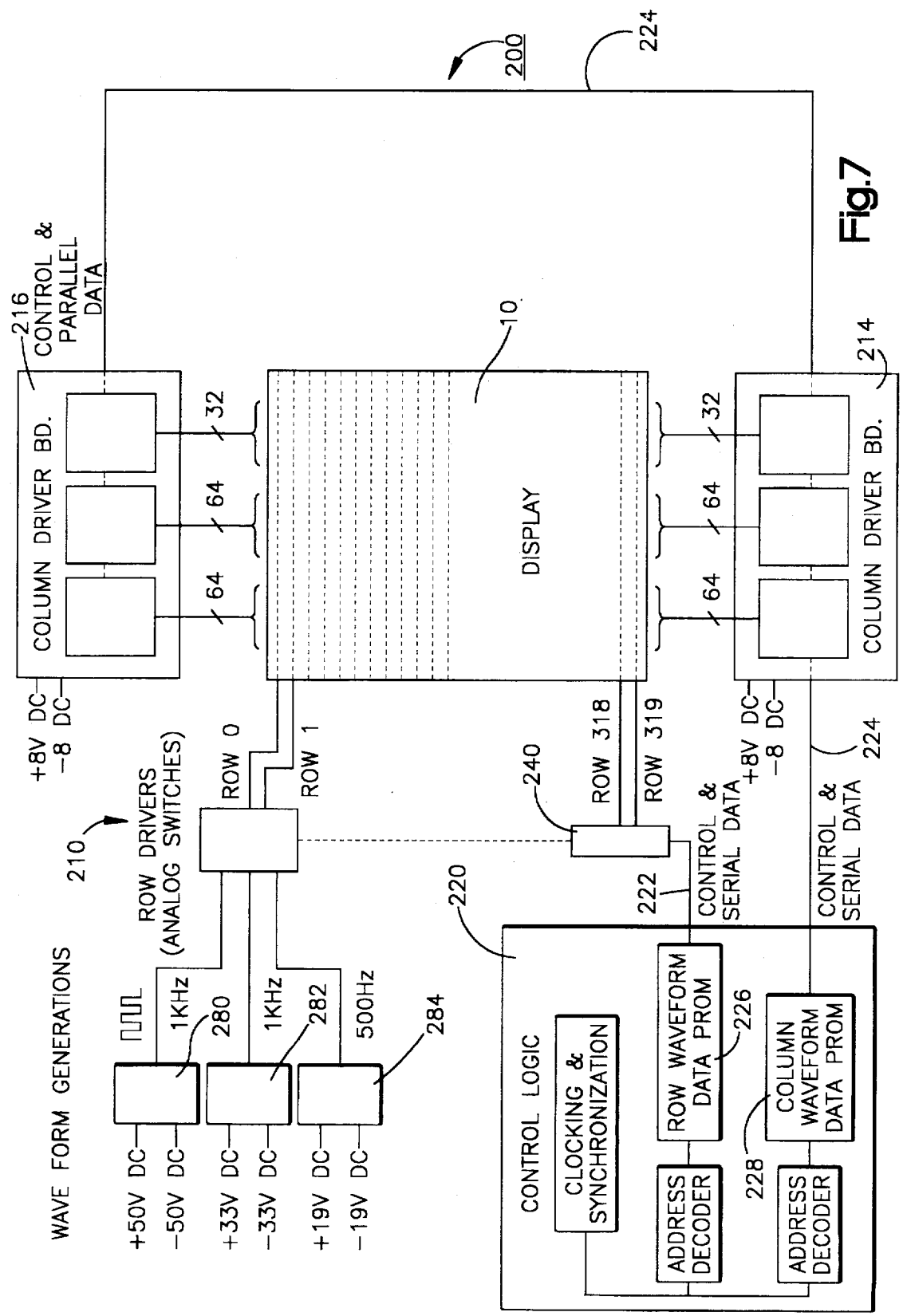
FIG. 7 is a block diagram of display driver circuitry for providing drive signals to activate a liquid crystal display.

FIGS. 4A–4F illustrate a manner in which these voltages are applied by the FIG. 7 drive circuit at edge inputs to the electrodes shown in FIG. 2. Turning to FIG. 4A, this figure depicts a plan view of the electrodes with the intervening structure of the containment plates 52, 54 and liquid crystal material removed for ease in depiction. The electrode 60a in the upper left-hand corner of FIG. 4A overlies the electrode 80a and, in a similar manner, the two electrodes 60b, 60c overlie the electrodes 80b, 80c.

Each of 20 rows R1–R20 simultaneously receives a 50 volt RMS signal during the preparation phase 110. A first row R1 bounded by three representative column electrodes 60a, 60b, 60c is about to complete its preparation phase 110 and a row R20 is just beginning its preparation phase. Voltages applied to the column electrodes of −8 volts, +8 volts, and the +8 volts at edge inputs 70a, 70b, 70c are not large enough to disrupt preparation picture elements that make up these 20 rows so that all the pixels of these rows are being converted to the homeotropic state.

Figure 4B:
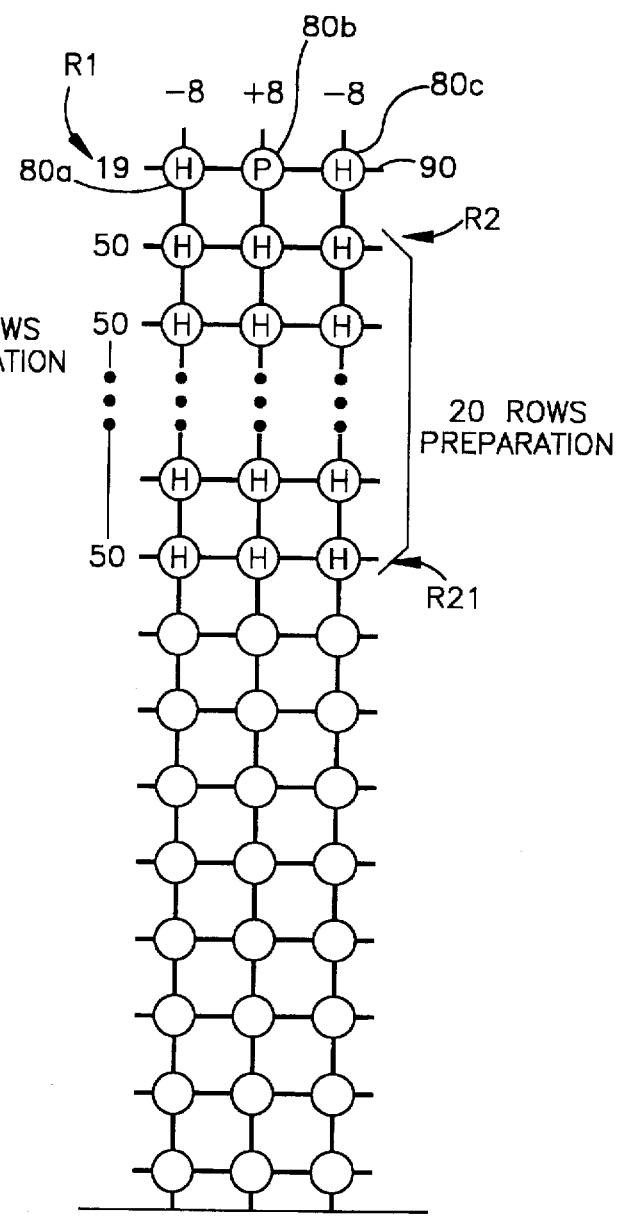

Turning to FIG. 4B, the drive circuits shift the 50-volt RMS signal one row downward as seen in FIG. 4B so that 19 of the 20 rows depicted in FIG. 4A remain in the preparation phase 110. The row R1 of electrodes that includes pairs of electrodes 60a, 80a, 60b, 80b, 80a, 80c on opposite sides of the layer is now energized with bi-polar voltages appropriate for the selection phase 114. A 19-volt RMS signal is applied to the edge input 90. Drive circuits coupled to the edge inputs 70a, 70b, 70c continue to apply 8-volt RMS signals of controlled polarity to select the state of the pixel element bound by the electrodes in this row R1.

The picture element bounded by the electrodes 60a, 80a has just entered the selection phase. Application of a voltage of −8 volts maintains this picture element in the homeotropic state. As seen in FIG. 3B, this will produce a twisted planar configuration for the final state. The picture element bounded by the electrodes 60b, 80b is energized to cause the pixel between these electrodes to switch to the transient twisted planar state. As seen in FIG. 3A, this will result in a focal conic configuration for the picture element in the final state.

The picture elements bounded by the electrodes depicted in FIGS. 4A and 4B are labeled with the designation "H" for homeotropic or "P" for planar to indicate the instantaneous state of the liquid crystal beneath the electrodes. Thus, the picture element bounded by the two electrodes 60b, 80b has been designated with a "P" designation in FIG. 4B.

Waveforms for choosing between either the focal conic or twisted planar end states are shown in FIGS. 5 and 6. As seen in these figures, square wave RMS signals are applied by the drive circuits to couple an appropriate voltage across a picture element during the selection phase time period T2. Three different waveforms are depicted. One waveform W1 indicates the row input signals along the input 90, for example. A second waveform W2 indicates a column input such as a signal at one of the inputs 70a, 70b, 70c. A third waveform W3 indicates the net or resultant signal across the picture element.

The waveforms in FIG. 5 maintain the liquid crystal in a homeotropic state during the selection phase. As discussed above, this results in a twisted planar final state for the liquid crystal. FIG. 6 shows voltage-activation waveforms W4, W5, W6 that allow the liquid crystal material to change from the homeotropic state during the preparation phase 110 to a transient twisted planar state during the selection phase 114. This causes the liquid crystal to switch to a focal conic state after the evolution phase.

Figure 4C:
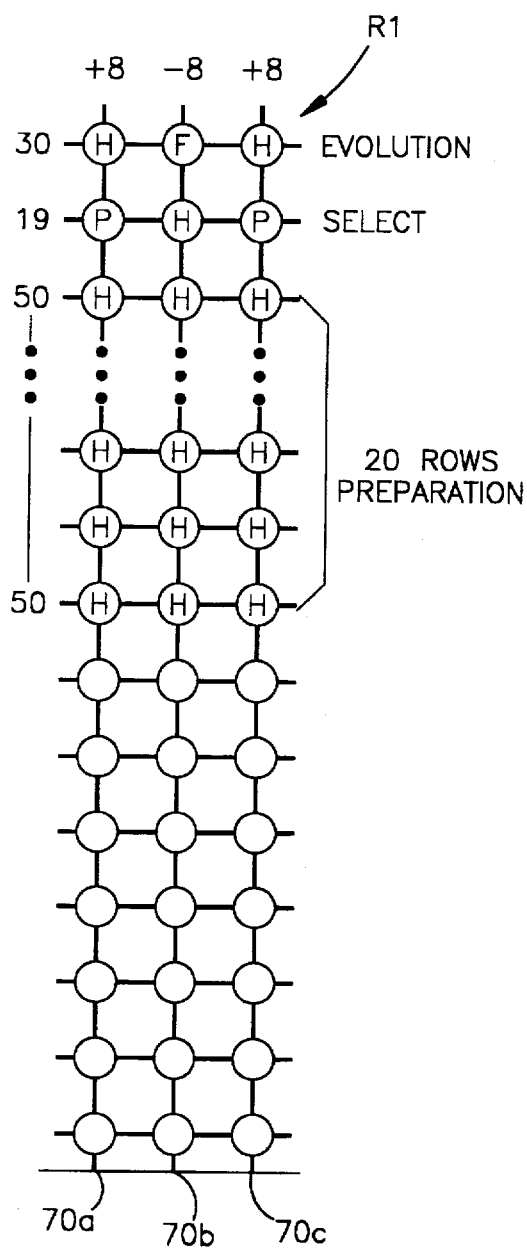
Figure 4D:
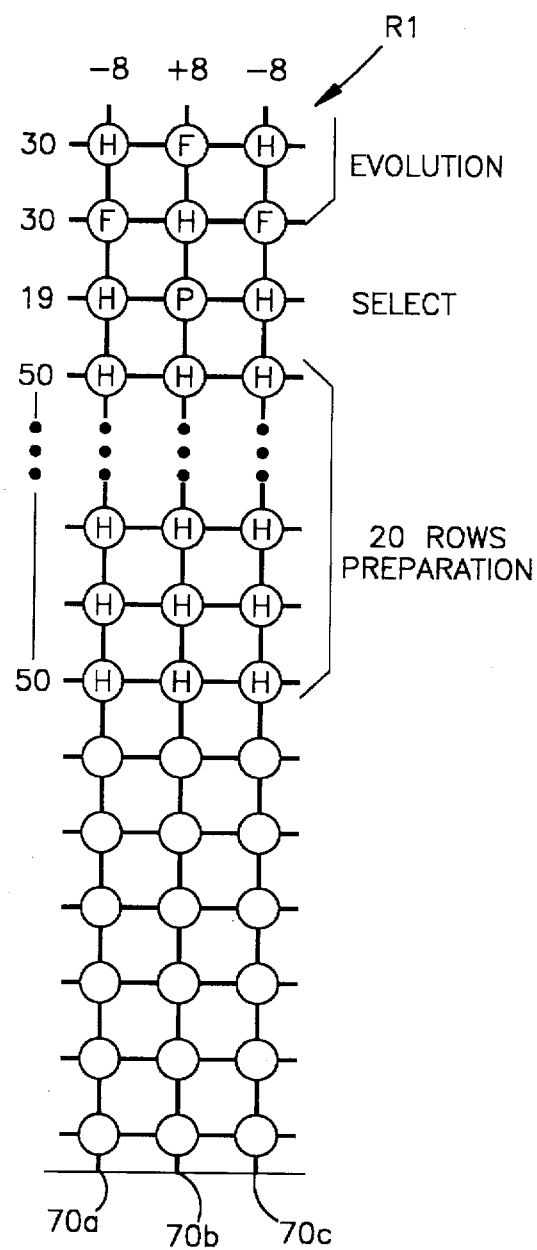

FIGS. 4C–4F show continued application of control voltages to the electrode array bounding the liquid crystal layer 50. In FIG. 4C, the electrodes in row R1 bound liquid crystal material entering the evolution phase (see FIGS. 3A, 3B). Recall that in the FIG. 4B depiction, the electrodes 60b, 80b bounded a picture element where the control voltage at the input 70b allowed a transition to the twisted planar state. During the evolution phase, this picture element enters the focal conic state and ultimately will achieve a focal conic configuration after the evolution stage has ended. The picture element bounded by the electrodes 60a, 80a remain in the homeotropic state since, during the selection phase of FIG. 4B for row R1, a column control voltage was applied to maintain that picture element in the homeotropic state.

Figure 4E:
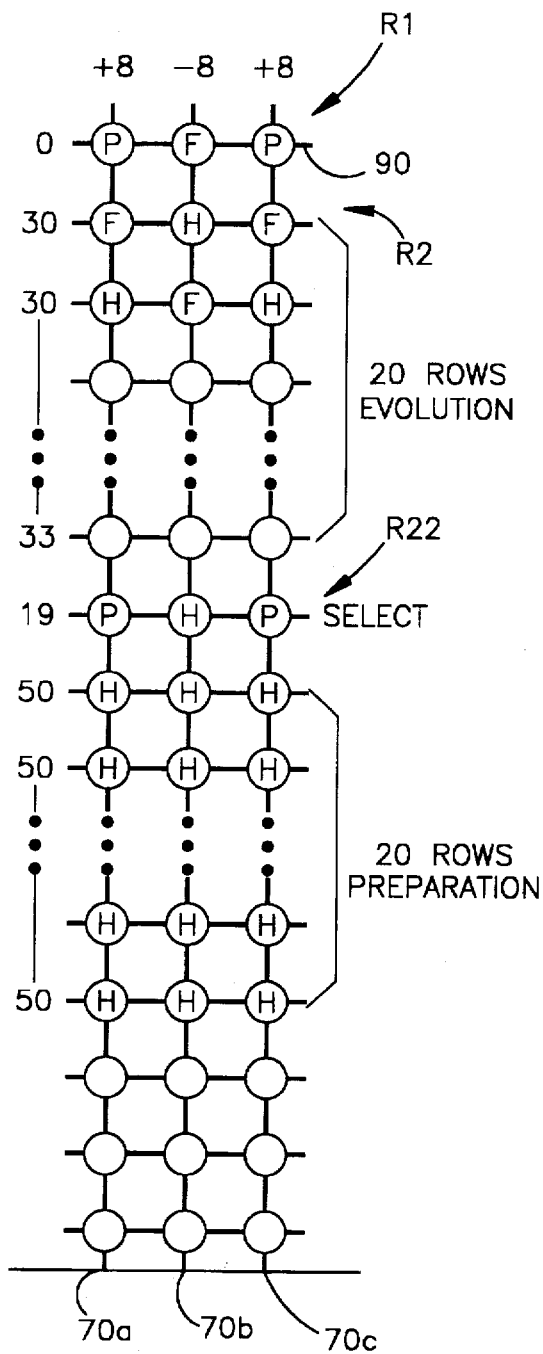
Figure 4F:
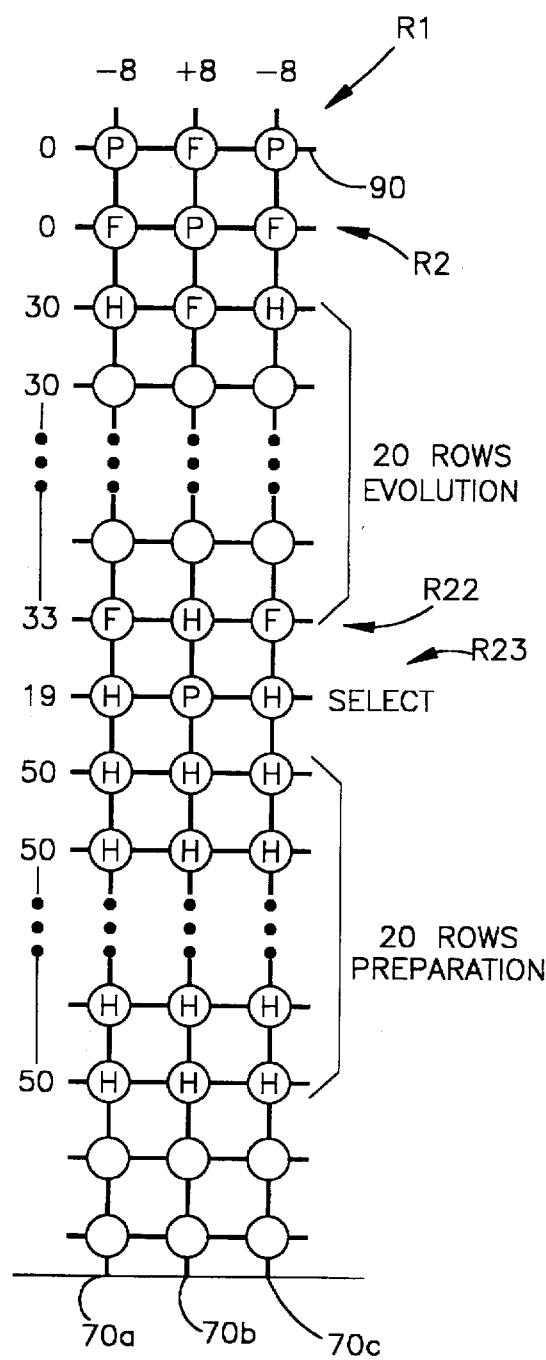

FIG. 4E depicts the row R1 after pixels of that row have experienced the evolution phase. The control voltage at the input 90 is reduced to 0 volts. The column inputs 70a, 70b, 70c are still selectively switched to activate a row R22 having just completed the preparation phase. This row R22 is spaced from the first row R1 by 20 other rows. FIG. 4F shows a situation wherein two rows R1, R2 have reached the end state as indicated by application of 0 volts along the row inputs to these two rows R1, R2. The column inputs 70a, 70b, 70c continue to vary depending upon the desired pixel states of a row R23 just beneath the row R22.

In a variation of the preferred embodiment, the preparation stage may be modified to allow less image retention from the initial states of the liquid crystal prior to entering the preparation phase, which degrades the final reflectance from the device. In this further embodiment, the preparation stage can include a pre-aligning sequence adapted to more completely align the liquid crystal into the homeotropic texture prior to the selection phase. By more completely switching the material into the homeotropic texture during the preparation phase in accordance with this embodiment, any effect on the appearance of the final optical state of a pixel caused by differences in the initial states prior to the preparation phase is essentially eliminated. This also improves the contrast ratio.

In this additional preferred embodiment the preparation phase is modified to include a pre-aligning sequence. The time interval of the preparation phase T1 is divided into three segments, namely $T_{p1}$, $T_{p2}$ and $T_{p3}$. In the time interval $T_{p1}$ a high voltage sufficient to homeotropically align the liquid crystal is applied as is the case for the normal practice described above. After a short time interval $T_{p1}$, the voltage is reduced or eliminated for a time interval $T_{p2}$, which lasts only about 5 ms to allow the liquid crystal to enter the transient planar texture. The voltage applied during time interval $T_{p2}$ can be zero, but in any case must be less than about 14V in order to permit the liquid crystal to transition into the transient planar texture. From the transient planar texture the liquid crystal can be more easily and completely switched to the homeotropic texture during time interval $T_{p3}$, during which the preparation voltage $V_p$ is applied to homeotropically align the liquid crystal for the duration of the preparation phase.

If desired the pre-aligning sequence, i.e., time intervals $T_{p1}$ and $T_{p2}$ can be repeated any number of times within the preparation phase T1. Not only does the modification of the preparation phase described in this additional embodiment eliminate the image retention problem and improve contrast between the final states, it also enables the required voltage and time period for the preparation phase to be reduced because the it makes it easier to obtain good homeotropic alignment. As a result of lower voltage and current loads being required, less expensive driver electronics can be employed.

In another preferred embodiment of the invention, the evolution voltage $V_E$ is selected to be relatively low, for example 10 to 15 volts, to alter the final state or appearance of the cell. In this embodiment, the evolution stage may employ voltages to cause evolution of transient planar texture obtained by the selection voltage to reflective planar rather than focal conic. In this embodiment the final states that result from the selection phase will be different than those resulting when the evolution voltage is higher in value. An advantage of this embodiment is that the states that are present at the end of the evolution time interval are the final states, and no transitions occur at the conclusion of the evolution phase. Thus, this embodiment differs from the previous embodiment only in the voltage applied following the selection phase and hence, in the resulting liquid crystal states. At the conclusion of the selection phase a voltage is applied to the pixels that has a level that allows pixels in the transient planar state to evolve into the reflecting twisted planar state, and pixels that are in the homeotropic state to evolve to the focal conic state. Therefore, the voltage level in this evolution phase must be chosen to be high enough so that the homeotropic state does not transform into the transient planar state, but low enough so that the transient planar state does not evolve into the focal conic texture and so that the homeotropic state transforms into the focal conic texture.

After the evolution phase of this additional embodiment, the voltage applied to the pixels can be reduced to zero, and because of the zero field bistability of these materials, the pixels that have evolved to the planar texture will remain in that state and pixels that have evolved to the focal conic texture will remain in that state at zero field. Thus, the method according to this embodiment employs the same preparation and selection phases as described previously. However, in the hold phase, the voltage can be lowered to a lower value or removed entirely and the pixels will remain in the planar or focal conic states obtained during the evolution phase.

FIG. 7 is a block diagram of a circuit 200 for energizing edge contacts to achieve a specified output from the display 10. The particular display depicted in FIG. 7 is a matrix of 320 by 320 picture elements. This display thus includes 320 rows with each row having 320 individually controllable picture elements.

From the above discussion it is apparent that each row and each column of the display 10 has an contact or connector at the edge of the display for coupling a control voltage to an electrode that extends across the display. The block diagram of FIG. 7 shows the circuits for energizing or driving these edge contacts divided into groups spaced about the outer periphery of the display. A group of row drivers 210 on one side of the display activates edge contacts coupled to the even rows (0, 2, 4 etc) in the display and a second group of row drivers 212 on the opposite side of the display activates edge contacts coupled to the odd rows (1, 3, 5 etc) of the display. Similarly, a group of column drivers 214 activates the even columns and a second group of column drivers 216 activates the odd columns.

Each of the sets of row and column drivers is electrically connected to a control/logic circuit 220 which controls the presentation of data on the display 10. Data and control signals from the control/logic circuit 220 are presented on two control data busses 222, 224. Data on these two busses is output from two electronically programmable memory circuits 226, 228. Control signals are generated from a logic portion of the circuit 220.

Figure 10:
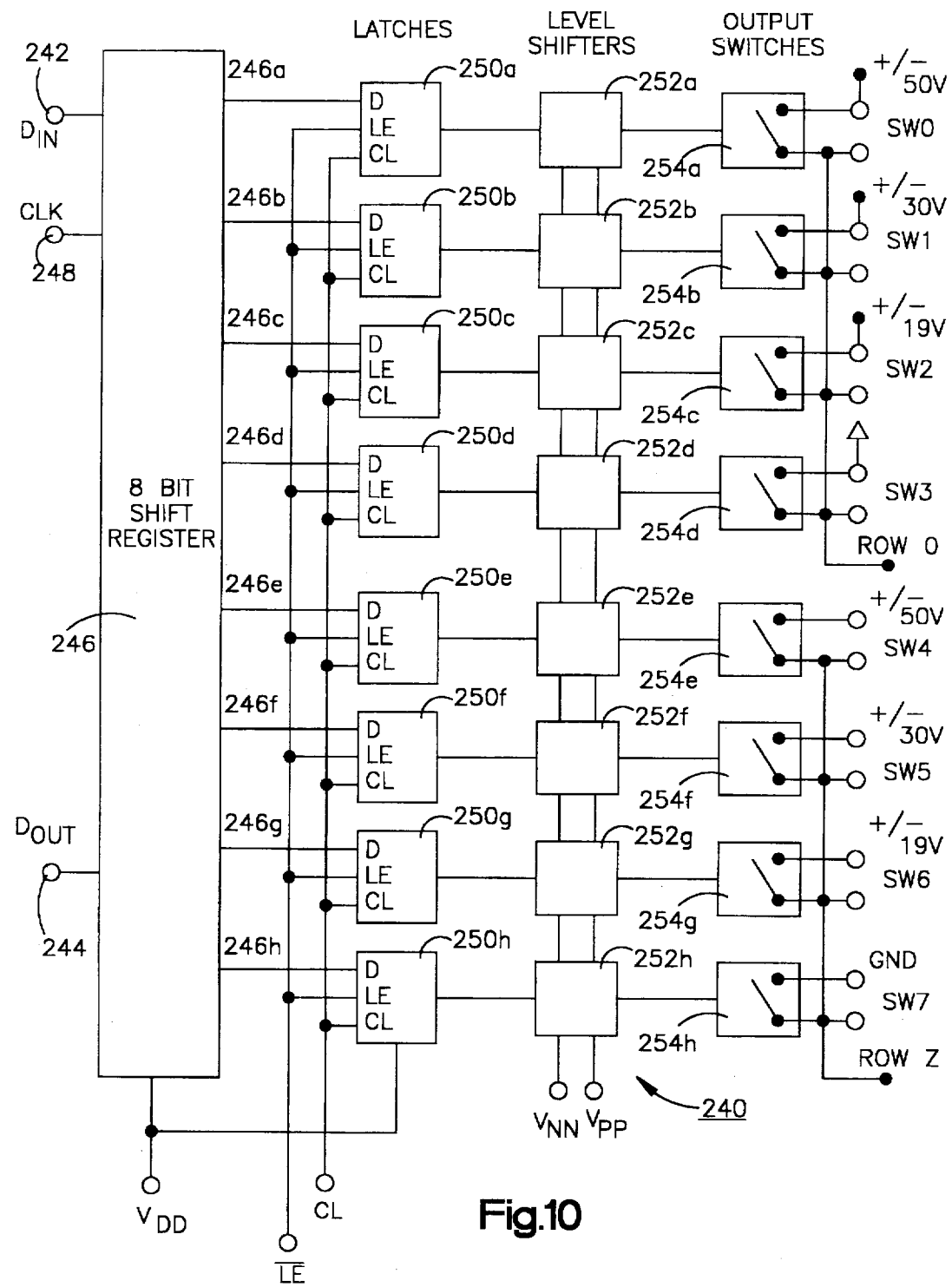
FIG. 10 is a schematic of an analog switch used to construct the display driver circuits.

The row drivers 210 on the left of the display in FIG. 7 is made up of 160 analog switches 240 connected in series. A functional block diagram of one of these switches is depicted in FIG. 10. A preferred analog switch used to construct the row drivers is model HV204 analog switch commercially available from Supertex.

As seen in the functional block diagram of FIG. 10 each analog switch 240 includes a data input 242, a data output 244 and an eight bit shift register 246 for holding data. The data consists of two state data bits. Data at the data input 242 is clocked into the shift register 246 by toggling a clock input 248.

The shift register has eight parallel outputs 246a-246h. Data at these outputs is presented to eight latch circuits 250a-250h. Each of these latch circuits has a clear input CL and a latch enable input NOT LE connected to the control portion of the control/data bus 222. The latch is cleared upon application of a signal to the clear input and latches the data presented at a D input to the latch upon receipt of a load enable signal. The data latched into the latch is presented at an output from the latch and communicated through an associated one of eight level shifters 252a-252h.

Each of the analog switches 240 also includes eight switch or output portions 254a-254h. The status of the latch determines the state of an associated output or switch portion of the analog switch. If the latch contains a high bit the switch output closes and if the latch has a low bit the switch output opens. As a specific example, if the latch 250h has a high bit latched from the shift register, the switch portion 254h connects together two contacts 260, 262 seen in FIG. 10.

To understand how data from the data bus 222 must be clocked through the series connected analog switch circuits 240 one must understand that each of the analog switches 240 has two input pins that are connected to a +/−50 volt waveform, two pins connected to a +/−30 volt waveform, two pins connected to a +/−19 volt waveform and two pins that are grounded. Outputs associated with these four different voltage inputs are coupled together. This is seen in FIG. 10 where one sees that the switch portion 254a is connected to a +/−50 volt signal, the switch portion 254b is connected to a +/−30 volt signal, the switch portion 254c is connected to the +/−19 volt signal and the input to the switch portion 254d is grounded. Also note that the outputs from each of these switch portions are connected together and also connected to row 0 of the display 10.

When the row designated as row 319 (FIG. 7) is to experience the preparation phase 110 the shift register is loaded with a bit pattern that assures a high bit is latched into the latch 250a when the latch enable input is toggled. The outputs to the three latches 250b, 250c, 250d must be low during the preparation phase. Since the display 10 is updated serially from bottom to top as seen if FIG. 7 it is seen that the row energization signals appropriate for a given row will be appropriate for the next row a short time later so the control circuit 220 need only shift the data within a shift register by suitable application of 4 clock signals to each shift register. A series of bits appropriate to achieve twenty preparation cycles, one selection cycle, and then twenty evolution cycles are shifted into a bottommost analog switch 240 and shifted up through all the row drivers by appropriate clocking of the clock inputs to the shift registers. After each clock signal the control 220 causes the latches to simultaneously latch data for appropriate energization of edge contacts. The control 220 co-ordinates the presentation and clocking of data so that the row drivers receives the appropriate data.

At any time during a display update only one row of the 320 rows in the display is energized with a bi-polar selection signal. The state of each pixel (twisted planar or focal conic) in that row is stored in a second electronically controllable memory 228. Each time the row driver configuration changes it is the responsibility of the control circuit 220 to load the correct column data into the two column drivers 214, 216. As seen in FIGS. 5 and 6 the purpose of the column drivers 214, 216 is to control the phase of the +/−8 volt signal for each of the 320 pixels of the row that is experiencing the selection phase.

The preferred column drivers 214, 216 are built using SMOS column driver integrated circuits (identified by part number SED1191f). Each of the two column drivers is built on a circuit board 220 that has +8 volt and −8 volt inputs 270, 272 that drive the column edge contacts such as the representative contacts 70a, 70b, 70c of the display 10.

Figure 8:
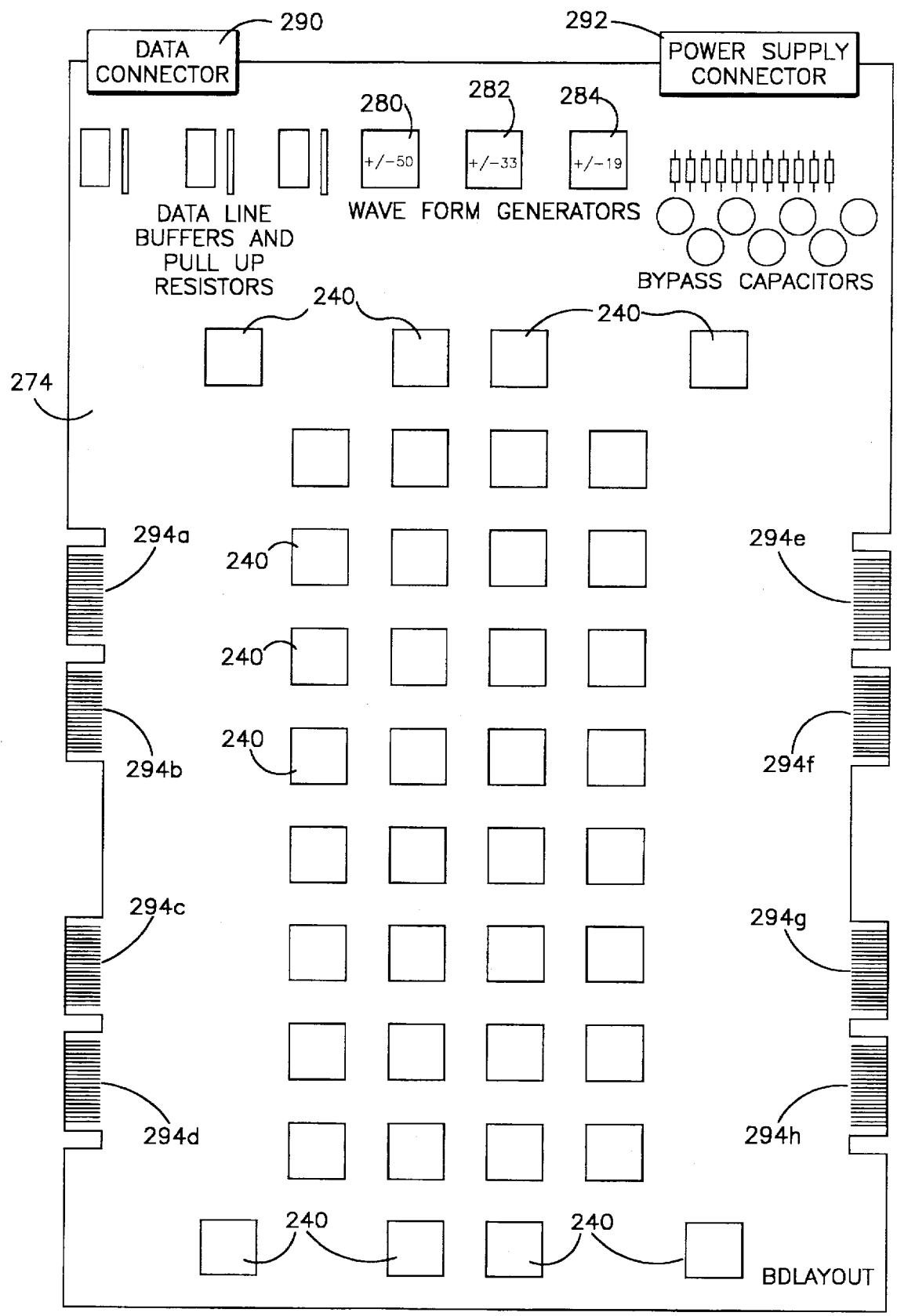
FIGS. 8 and 9 illustrate a board layout of the display drive circuits shown in block diagram form in FIG. 7.
Figure 9:
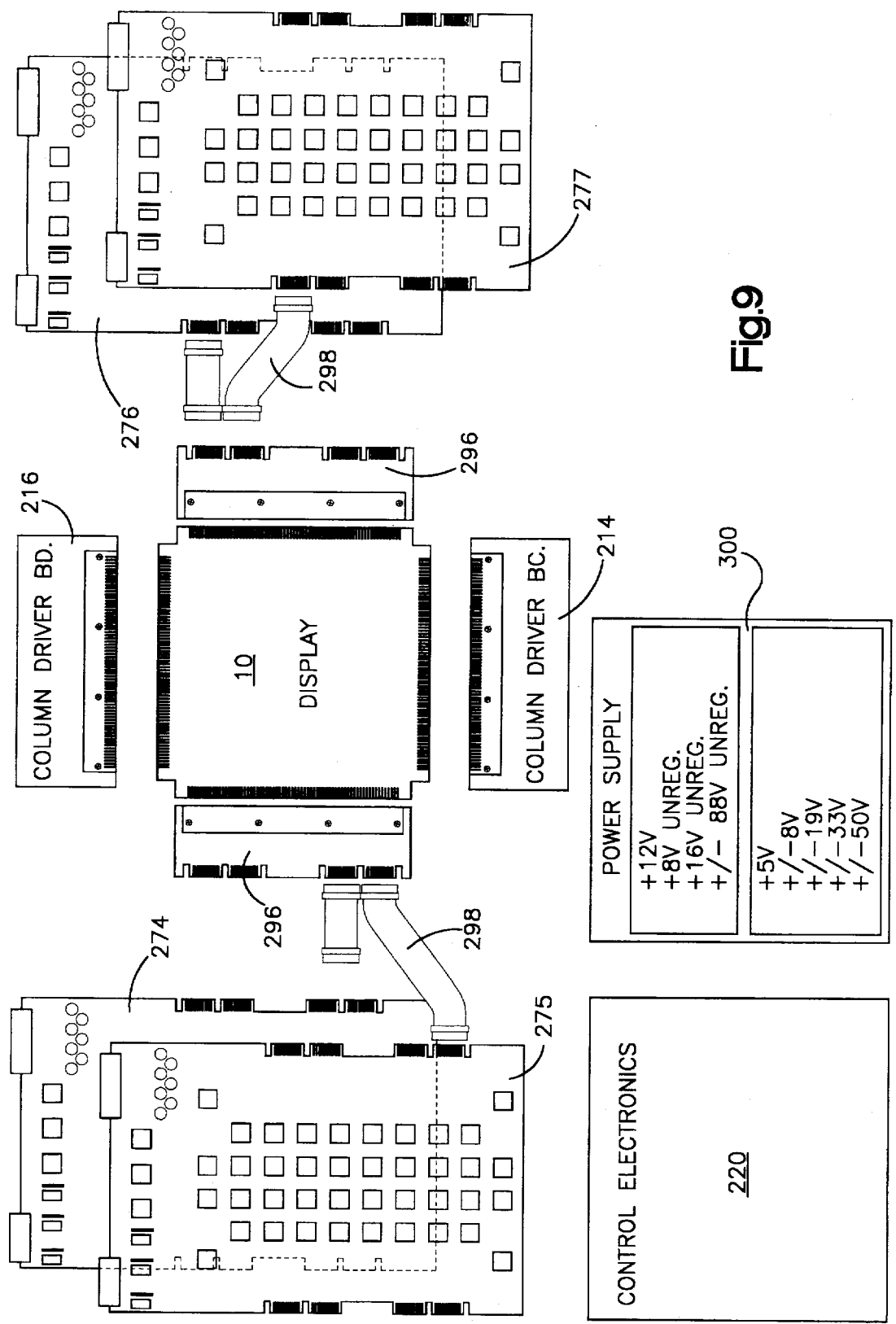

A layout of a row driver printed circuit board 274 supporting forty of the analog switches 240 is shown in FIG. 8. Since the row drivers 210 require 160 such analog switches, the drivers 210 are made up from four circuit boards 274, 275, 276, 277 (FIG. 9).

The circuit board depiction in FIG. 8 includes three analog switches 280, 282, 284 that are waveform generators for providing bi-polar signals to the other forty analog switches on the circuit board 274. The analog switch 280 provides a square wave bi-polar (+/−) 50 volt signal that is connected to each of the analog switches 240. The analog switch 282 provides a bi-polar (+/−) 30 volt signal and the analog switch 284 provides a bi-polar (+/−) 19 volt signal.

The square wave output from the waveform generators is achieved by coupling one positive and one negative voltage of the appropriate magnitude to two analog switch inputs and connecting together the outputs associated with those inputs. By appropriate adjustment of the data clocked into the shift register of the analog switch circuit the bi-polar output from the switch is provided.

The circuit board 274 includes a number of input and output connectors for interfacing. One connector 290 connects to the control and data bus 222 to supply control and data signals to the board. A power supply connector 292 provides the appropriate power signals to the board from a regulated power supply 300 shown in FIG. 9. Edge connectors 294a–294h on opposite sides of the board output row drive signals to a transition printed circuit board 296 (FIG. 9) that multiplexes the row drive signals to an appropriate row electrode of the display 10. As an example, the connector 294a supplies twenty signals for driving twenty rows of the display. These twenty signals are coupled to a flexible multi-conductor printed circuit cable 298 having contacts at one end to engage one of the connectors 294a–294h. An opposite end of the cable 298 has contacts that engage a connector on the transition printed circuit board 296.

The circuitry for the column drivers is mounted to the two printed circuit boards 214, 216. These circuit boards not only support the circuitry for applying an appropriate phase signal to the pixels across a row in the display undergoing the selection phase, but also includes the circuitry for routing the signals from the circuits to the edge contacts of the display 10.

The column driver boards 214, 216 each include three SMOS 1191f display driver integrated circuits and necessary capacitors, resistors, level translators and an analog switch that serves as a ground switch. Each of the SMOS circuits has its own data input from the 8 bit parallel data bus 224. Each clock pulse of the column board driver boards gathers a byte of data so that each of the six driver integrated circuits gets one data bit on each clock signal. Since of the integrated circuits has 64 outputs, it requires 64 data bytes on the bus 224 to completely configure a row. Thus as the selection phase reaching each new row, 64 bytes of column data is loaded into the driver boards 214, 216 to control the appropriate phase of the +/−8 volt square wave signal output from the boards 214, 216.

It is appreciated that although the invention has been described with a degree of particularity, it is the intention that the invention include all modifications or alterations from the disclosed design falling within the spirit or scope of the appended claims.

We claim:

1. A method of addressing a bistable chiral nematic liquid crystal material disposed between electrodes arranged on opposed sides of said liquid crystal and adapted to selectively apply an electric field through said liquid crystal material, said method comprising the steps of energizing said electrodes to establish a preparation voltage across said liquid crystal during a preparation phase, thereafter energizing said electrodes to establish a selection voltage across said liquid crystal during a selection phase for selecting a final display state for said liquid crystal, next energizing said electrodes to establish an evolution voltage across said liquid crystal during an evolution phase, and thereafter permitting said liquid crystal to exhibit the final display state.

2. The method according to claim 1 wherein after said evolution phase, the evolution voltage to said electrodes is reduced to allow said liquid crystal to exhibit one of its final display states.

3. The method according to claim 1 wherein after said evolution phase, the voltage to said electrodes is removed to allow said liquid crystal to exhibit one of its final display states.

4. The method according to claim 1 wherein said preparation voltage is of a magnitude, and said preparation phase is of a duration, sufficient to homeotropically align said liquid crystal material.

5. The method according to claim 4 wherein said preparation phase is up to about 40 ms in duration.

6. The method according to claim 1 wherein said liquid crystal is a chiral nematic liquid crystal and the magnitude of said selection voltage is selected to either maintain said liquid crystal in a homeotropic texture or to permit said liquid crystal to initiate a transition to a transient twisted planar texture.

7. The method according to claim 1 or 6 wherein said selection phase is less than about 2 ms in duration.

8. The method according to claim 1 wherein said liquid crystal is a chiral nematic liquid crystal and said selection voltage is of a magnitude sufficient to establish one of a focal conic or a twisted planar final display state.

9. The method according to claim 1 wherein said liquid crystal is a chiral nematic liquid crystal and said evolution voltage is of a magnitude, and said evolution phase is of a duration, effective to maintain liquid crystal that is in a homeotropic texture in said homeotropic texture, and to allow liquid crystal in a transient twisted planar texture to evolve to a focal conic texture.

10. The method according to claim 1 wherein said liquid crystal is a chiral nematic liquid crystal and said evolution voltage is of a magnitude, and said evolution phase is of a duration, effective to allow liquid crystal in a transient twisted planar texture to evolve to a reflecting twisted planar texture, and to allow liquid crystal in a homeotropic texture to evolve to a focal conic texture.

11. The method according to claim 1 wherein said liquid crystal is a chiral nematic liquid crystal and said preparation phase includes a pre-aligning sequence comprising applying a voltage effective to homeotropically align said liquid crystal, followed by a time interval of from about 0.5 to about 5 ms wherein the voltage is removed or reduced to a magnitude effective to permit said liquid crystal to commence a transition to a transient twisted planar texture, and then applying a voltage effective to homeotropically align the liquid crystal for the balance of said preparation phase.

12. The method according to claim 1 wherein said liquid crystal is a chiral nematic liquid crystal having a pitch length in said twisted planar texture effective to reflect light in the visible spectrum.

13. A method for displaying information comprising the steps of:
 a) providing a layer of bistable liquid crystal material and arranging electrodes on opposed sides of the liquid crystal material to form an array of display elements;
 b) coupling the electrodes to a drive circuit for energizing the electrodes to selectively activate the display elements of the array to one of a first and a second final display; and
 c) addressing selected display elements of the array by sequentially energizing the liquid crystal material at a selected display element location with a preparation signal during a preparation phase, reducing the preparation signal to a selection signal for pre-disposing the liquid crystal material to later attain a desired final display state, changing the signal across the display element to an evolution signal during an evolution phase, and then allowing the display element to exhibit the desired final display state which is different than the state of the liquid crystal material during application of said selection signal.

14. The method of claim 13 wherein the first final display state is a twisted planar texture of the liquid crystal material and the second final display state is a focal conic texture of the liquid crystal material.

15. The method of claim 13 comprising providing a layer of chiral nematic liquid crystal material having a pitch length effective to reflect light in the visible spectrum.

16. The method of claim 13 comprising arranging said electrodes on one side of the liquid crystal layer in generally parallel rows and electrodes on an opposite side of the liquid crystal layer in generally parallel columns substantially orthogonal to said rows, whereby said display elements are defined by the points on said rows and columns at which said rows and columns would intersect when in the same plane, and further wherein a plurality of rows of display elements are simultaneously in said preparation phase.

17. The method according to claim 13 comprising arranging said electrodes on one side of the liquid crystal layer in generally parallel rows and electrodes on an opposite side of the liquid crystal layer in generally parallel columns substantially orthogonal to said rows, whereby said display elements are defined by the points on said rows and columns at which said rows and columns would intersect when in the same plane, and further wherein a plurality of rows of display elements are simultaneously in said evolution phase.

18. A display apparatus comprising:

a) a layer of bistable chiral nematic liquid crystal material;

b) multiple electrodes spaced on opposite sides of the liquid crystal layer for applying selected activation voltages across multiple picture elements of the liquid crystal layer; and c) control electronics for sequentially setting a display state of multiple picture elements of the liquid crystal layer comprising circuitry for:

i) applying a preparation signal across a selected picture element during a preparation phase;

ii) applying a selection signal across said selected picture element during a selection phase to select a predetermined final display state; and iii) applying an evolution signal across said selected picture element during an evolution phase.

19. The apparatus of claim 18 wherein the control electronics comprises circuitry for applying bipolar preparation, selection and evolution signals to the multiple picture elements.

20. The apparatus of claim 18 wherein electrodes on one side of the liquid crystal layer are arranged in generally parallel rows and electrodes on an opposite side of the liquid crystal layer are arranged in generally parallel columns substantially orthogonal to said rows and said picture elements are defined by the points on said rows and columns at which said rows and columns would intersect when in the same plane, wherein when the control electronics applies a voltage signal to a row electrode, all picture elements in that row are electrically connected to the same voltage signal and when the control electronics applies a voltage signal to a column electrode, all picture elements in that column are connected to the same voltage signal.

21. The apparatus of claim 18 wherein the control electronics includes a timer to control the timer durations of the preparation, selection and evolution signals.

22. The apparatus of claim 20 wherein the control electronics includes circuitry for applying said preparation signal to a plurality of rows of said picture elements.

23. The apparatus of claim 20 wherein said control electronics includes circuitry for applying said evolution signal to a plurality of rows of said picture elements.

24. The apparatus of claim 20 wherein said control electronics includes circuitry for simultaneously applying said selection signal to a plurality of rows of said picture elements.

25. The apparatus of claim 18, wherein said control electronics circuitry predisposes said layer of bistable chiral nematic liquid crystal material to a state different than said predetermined final display state during said selection phase.

* * * * *

UNITED STATES PATENT AND TRADEMARK OFFICE
CERTIFICATE OF CORRECTION

PATENT NO. : 5,748,277
DATED : May 5, 1998
INVENTOR(S) : Huang et al.

It is certified that error appears in the above-identified patent and that said Letters Patent is hereby corrected as shown below:

Column 1, line 4 insert the following:

---The United States government has a paid-up license in this invention and may have the right in limited circumstances to require the patent owner to license others on reasonable terms as provided for by the terms of contracts HDDT 972-90-C-0037, awarded by Defense Advanced Research Projects Agency, and N61331-94-K-0042, awarded by Advanced Research Projects Agency.---

Signed and Sealed this

Twenty-fifth Day of May, 1999

Attest:

Q. TODD DICKINSON

Attesting Officer

Acting Commissioner of Patents and Trademarks